No. 69,466. PATENTED OCT. 1, 1867.
L. B. MILLER.
MACHINE FOR MILLING TWIST DRILLS.
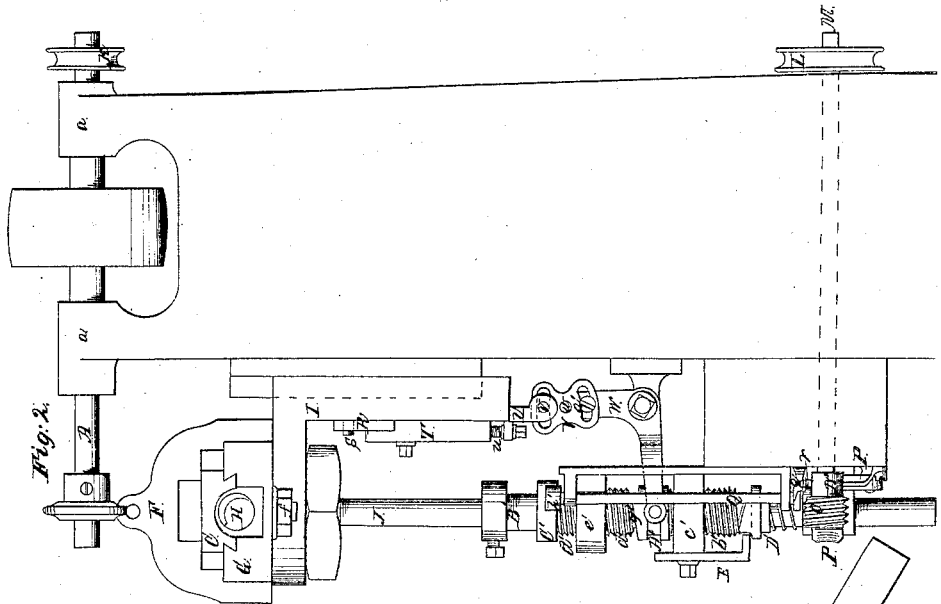
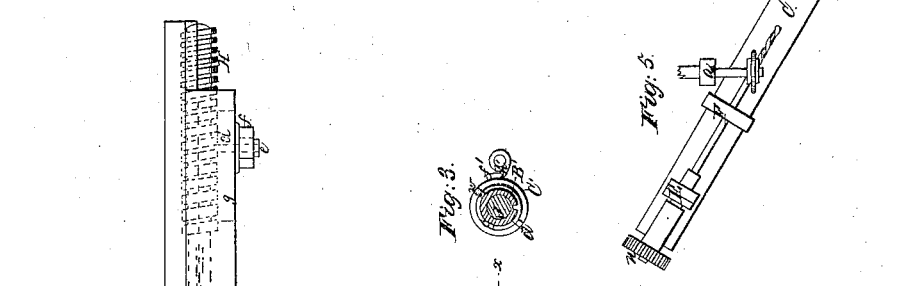
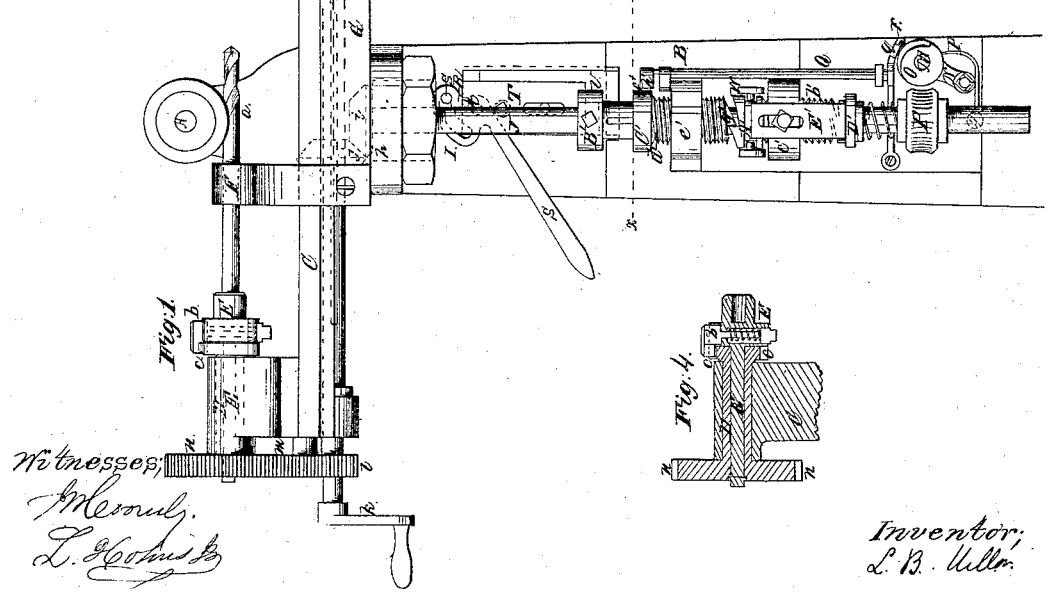
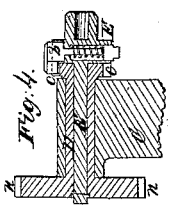
Witnesses:
Inventor:
L. B. Miller.

United States Patent Office.

L. B. MILLER, OF JERSEY CITY, NEW JERSEY.

*Letters Patent No. 69,466, dated October 1, 1867.*

---

IMPROVED MACHINE FOR MILLING TWIST-DRILLS.

---

*The Schedule referred to in these Letters Patent and making part of the same.*

---

TO ALL WHOM IT MAY CONCERN:

Be it known that I, L. B. MILLER, of Jersey City, in the county of Hudson, and State of New Jersey, have invented a new and useful Improvement on Milling Machines, of which the following is a full, clear, and exact description, reference being had to the accompanying drawing, forming part of this specification, and in which—

Figures 1 and 2 represent elevations, at right angles to each other, of a machine constructed according to my invention.

Figure 3 a transverse section of the driving mechanism in part, taken as denoted by the line $x\ x$ in fig. 1.

Figure 4 a diagram or plan, illustrating the relative arrangement of the cutter and its work, and Figure 5 a vertical longitudinal section through the work-holding spindle.

Similar letters of reference indicate corresponding parts.

Though the machine represented in the accompanying drawing is more specially designed to making twist-drills, it, or certain features of the improvement, is or are equally applicable to milling machines used for performing other work. It will suffice here, however, by way of illustration, to describe the machine as applied to the production of twist-drills. My invention consists, firstly, in a combination spindle to rotate the work or drill, so constructed that, without detaching the gearing whereby it is worked, the position of the work is changed to establish cut in a new line, as, for instance, where it is required to make two or more spiral grooves in a drill; secondly, in a novel device for withdrawing the work from the cutter, or adjusting it thereto, when the work is reversed, consisting of a peculiarly arranged cam or eccentric, with its adjustable connections; thirdly, in an adjustable cam or eccentric, together with other devices, for giving an irregular depth of cut throughout the length or line of cut; fourthly, in a reversing carrier, to return said travelling clutch or clutches, when reversing the work, to the same position as at the commencement of the cut; fifthly, in the arrangement of the driving-shaft, work-holding carriage, and milling tool relatively to each other, so that the feeding-screw may be driven by gearing at or about the centre on which the carriage swings.

Referring to the accompanying drawing, A is the cutter-spindle, driven to revolve in or through suitable heads $a\ a$ of a frame, B, and carrying, at or near its forward end, an appropriate milling tool or cutter. C is the slide which carries the drill or drill-blank that is connected with a combination spindle made up of a spindle or shaft, D, having in locking gear with it a secondary spindle, E, that serves, by chuck or otherwise, to carry the drill or drill-blank, which projects through a guide, F, connected with the bed-piece G of the slide or sliding-carriage C, the gear of the spindles D and E being established by means of a spring-borne catch or dog, $b$, fitted to or through a flange or enlargement of the one spindle E, and shooting into notches $c$ in a flange or enlargement of the spindle D, whereby the spindle E, carrying the drill-blank, may be turned and set to any desired position to change the position of the drill relatively to the cutter, as, for instance, giving it a half turn, to form a second spiral groove in the drill, without detaching the gearing by which motion is communicated to the spindles D and E; it only being necessary, to produce such change of position, to press outwards on the shank end of the dog $b$, and turn the spindle till the dog falls or shoots into lock with its next or appropriate notch. The bed G of the sliding-carriage C is provided with a feeding-screw, H, to give motion to the drill or drill-blank in a lengthwise direction across the edge of the milling tool or cutter. This feeding-screw H, when it is required to cut a thread or groove of variable pitch, is of a correspondingly variable character, being, say, when it is desired to cut a twist-drill which is slow and powerful on entering its work, but gradually quickens and increases in speed afterwards, of a slow pitch at its point, and increasing or quickening towards its rear end. To accommodate this variably pitched screw to the box through which it works, said box or clip $d$ is shaped to fit such variable pitch, and is hung to swivel as at $e$, through the nut $f$, which secures it to the bed G, so that it may turn to accommodate itself to the pitch, the box or clip, moreover, being adjustable, on slacking the nut $f$, along a slot, $g$, in the bed, to vary the length of feed or pitch for a given distance in the length of the work. The bed G is hung to swing as at $h$, in or on a vertically sliding standard, I, to vary the angle or direction and width of cut, and through this centre the shaft J is projected, which, by means of a bevel pinion $i$, gives motion to the feeding-screw H through a pinion, $j$, on screw-shaft, having a spline working in a longitudinal groove therein, so that the feeding-screw is driven at or about the centre upon which the sliding-carriage holding the work swings, which simplifies, and makes more correct or positive, the action generally. To run back or feed the work by hand, as is or may be necessary, the feeding-screw H is provided at its rear end with a handle, $k$, and pinion $l$, gearing through a second pinion $m$, with a spur-wheel or pinion, $n$, on the combination work-holding spindle, or portion D, thereof. From this description it will be seen that, on driving motion being communicated to the cutter, feeding-screw, and combination spindle which carries and rotates the work, a right or left-hand spiral groove of any desired width or angle, according to the swivel or set of the sliding-carriage, may be cut upon the drill-blank, and, if required, any number of grooves so cut thereon, without detachment of gearing, by simply, prior to a new cut, turning the one length or division of the combination spindle to lock by its dog, at a suitable point with the other length or portion thereof. When it is desired to give a regular spiral or twist to the drill, then a regular or uniformly pitched feeding-screw should be used. On the cutter-spindle A is a pulley, K, that serves to drive, by belt or band, a pulley, L, which gives motion to a shaft, M, that, at its inner end, has its bearing in a swinging arm, N, to admit of a screw, O, carried by the shaft M, being thrown in or out of gear with a worm-wheel, P, secured by a spline or vertically sliding key to the shaft J, and by which the latter is rotated to drive the feeding-screw and work, a spring, $p$, serving to throw out of gear the screw O, with the worm-wheel P, when tripped or not held up to its connection with said wheel by a dog acting on or against a stud, $r$, projecting from the swinging arm N, said dog being fast to a vertical spindle, Q, operated at intervals, as hereinafter described.

To adjust or bring the work up to the cutter when the former is in position, as regards the feed, for establishing a cut, and to remove it from the cutter when the work is reversed or required to be run back after the cut has been made, the slide I, carrying the work, sliding-carriage, and feeding-screw, is raised or lowered by means of a slotted cam or eccentric, R, worked by a handle or lever, S, and acting against a stop, $s$, attached to the slide I, the slotted cam R vibrating on a pivot, $t$, distinct from the slide I, and which may be connected with an independent slide, T, adjustable through a vertical slot up or down by a screw, $u$, connecting it with an intermediately sliding bar, U, in the slide I, to give a fixed adjustment of the depth of cut by varying the altitude in play of the slide I; or the slotted cam R may be so shaped as that the throwing up or down of the lever S will not only serve to throw the work in or out, but also, by a sufficient adjustment of said lever, may serve to effect a deeper or shallower cut, as required.

As it is frequently necessary to give an irregular depth of cut throughout the whole line or length thereof, I connect to the sliding-bar U, or otherwise in a suitable manner, the slide I, by a stop, $v$, with a slotted cam or eccentric, V, pivoted as at $u$, to a bell-crank-shaped lever, W, and adjustable thereon by a slot and set-screw, $a'$, to increase or diminish the irregularity in the cut, said lever gearing with a clutch, $A'$, forming the head to a screw, $b'$, that is loose on the shaft J, and works through a box, $c'$. Fast, either in a permanent or adjustable manner, on the shaft J, so as to rotate with it, is a sleeve, $B'$, in spline gear with a screw, $d$, working through a box, $e'$, and having a circumferentially adjustable (by set-screw or otherwise) outer collar, $C'$, carrying a stud, $f'$, said screw $d'$ also having a clutch formation, $g'$, at its lower end, gearing, when down, with the clutch $A'$.

The operation of these parts is as follows: Supposing it be necessary to cut the groove in the drill-blank of an equal depth for a certain distance from its point, then the parts are so adjusted that the rotation of the shaft J works, by the sleeve $B'$, the screw $d'$ down free from contact or gear with the clutch $A'$ for a given distance, but afterwards, in the further descent of the screw $d'$, causes the latter to gear with and turn the clutch $A'$, and, in rotating it, to work the lever W, and through it the eccentric V, which, acting on the slide I, gradually diminishes, say, the depth of cut on the rear or after portion of the drill, the variation in depth of such irregularity depending upon the previous adjustment of the slotted cam or eccentric V. This operation goes on till the stud $f'$, on the collar $c'$, which is made circumferentially adjustable, to vary its time of action according to the length of cut to be made, strikes an arm or tooth, $h'$, fast to the shaft Q, which is thus vibrated, causing the dog $q$ to free its hold on the stud $r$, and so to trip M, and throw its screw O out of gear with the worm-wheel P. This stops the work, and is arranged to take place at the termination of the cut. In the operation thus described, the clutch $g$ of the screw $b'$ is brought in contact or gear with and made to depress a spring-borne sliding clutch, $D'$, in spline gear with the shaft J, and that, as the work is run back by the handle $k$, when the screw O has been tripped as described, serves to rotate and raise the screw $b'$, and through the clutches $A' g'$, the screw $d'$, and so to adjust the eccentric V and stud $f'$ to their original or normal positions for a repetition of the action hereinbefore described, on properly adjusting the drill-blank and slotted cam R to raise the work to a cutting position. To suit different lengths of blanks or cuts, the spring-borne clutch $D'$ has its motion arrested at the proper point by an adjustable or sliding-stop, E, which, accordingly as it is set higher or lower, regulates the height. The screw $d$, in the back run of the feed, is raised, and, through its connections, the tripping and other devices, which by their action determine or vary the length of cut.

What I claim as my invention, and desire to secure by Letters Patent, is—

1. The spindles D and E, one within the other, revolving in a common head, and locked together by the spring-bolt $b$, in combination with a longitudinal feeding device, having a diagonal adjustment to a rotary milling tool or cutter, substantially as specified.

2. The arrangement and combination of the vertical slide I, adjustable slide T, intermediate sliding-bar U, and slotted eccentric R, for regulating the depth of cut, substantially as set forth.

3. In combination with said vertically adjustable sliding-carriage, the adjustable cam or eccentric V, elbow-lever W, and clutch $A'$, operated by the screw $b'$, for giving an irregular depth of cut throughout the line or length thereof, substantially as specified.

4. The reversing carrier or spring-borne clutch $D'$, in combination with the clutches $g' A'$, nuts $e' c'$, and screws $d' b'$, for operation together, as herein set forth.

5. The arrangement of the driving-shaft J, the work-holding carriage having a longitudinal and swivelling motion, as described, and the burr or milling tool A, substantially as specified.

L. B. MILLER.

Witnesses:
J. W. COOMBS,
G. W. REED.